United States Patent [19]
Rivera

[11] Patent Number: 5,912,522
[45] Date of Patent: Jun. 15, 1999

[54] PERMANENT MAGNET DIRECT CURRENT (PMDC) MACHINE WITH INTEGRAL RECONFIGURABLE WINDING CONTROL

[76] Inventor: Nicholas N. Rivera, P.O. Box 565, Vienna, Va. 22180

[21] Appl. No.: 08/909,086

[22] Filed: Aug. 14, 1997

Related U.S. Application Data

[60] Provisional application No. 60/024,645, Aug. 22, 1996.
[51] Int. Cl.$^6$ ............................. H02K 3/00; H02K 23/02
[52] U.S. Cl. ......................... 310/184; 310/156; 310/180
[58] Field of Search .................................... 310/156, 195, 310/203, 206, 207, 184, 180, 177; 318/173, 174

[56] References Cited

U.S. PATENT DOCUMENTS

| | | | |
|---|---|---|---|
| 2,611,799 | 9/1952 | Ackerman | 310/195 |
| 4,217,529 | 8/1980 | Bourke et al. | 318/351 |
| 4,692,645 | 9/1987 | Gotou | 310/184 |
| 5,202,599 | 4/1993 | Kao | 310/234 |
| 5,412,268 | 5/1995 | Arnaud et al. | 310/67 R |
| 5,442,250 | 8/1995 | Stridsberg | 310/186 |
| 5,614,775 | 3/1997 | Horski et al. | 310/68 R |
| 5,614,799 | 3/1997 | Anderson et al. | 318/439 |

OTHER PUBLICATIONS

Excerpts from a book entitled: "Brushless Permanent–Magnet Motor Design" by Duane C. Hanselman, published in 1994 by McGraw Hill, Inc., New York; pp. 61–123 and 155–180.

Jan. 1996—Article entitled "Brushless DC Motor Provides High Power Density and High Efficiency at Low Cost for Electric Transportation" by Neil Garcia–Sinclair. Jan. 1996 issue of PCIM magazine at pp. 9, 10, 12, 14, 16, 19 and 20.

*Primary Examiner*—Nestor Ramirez
*Assistant Examiner*—B. Mullins
*Attorney, Agent, or Firm*—William D. Hall

[57] ABSTRACT

This PMDC machine concept operates from a constant dc voltage source with maximum torque capacity throughout its rotational speed range. The back electromotive force (back-emf) produced by the machine windings under the constant amplitude air gap field produced by the magnets is controlled by changing the winding configurations in series-parallel combinations. Torque is, thus, controlled from minimum to maximum speed without exceeding winding current capacities and without need to increase driving voltage with speed. At startup and low speed the combined back-emf of series connected windings limit current while producing maximum torque. At higher speeds where back-emf would severely limit torque, the windings are connected in series-parallel combinations for maximum achievable torque without exceeding winding current capacities. To accomplish this, windings concentrated in slots are used. Result is optimum utilization of core magnetics and capability of operating at constant input voltage.

42 Claims, 8 Drawing Sheets

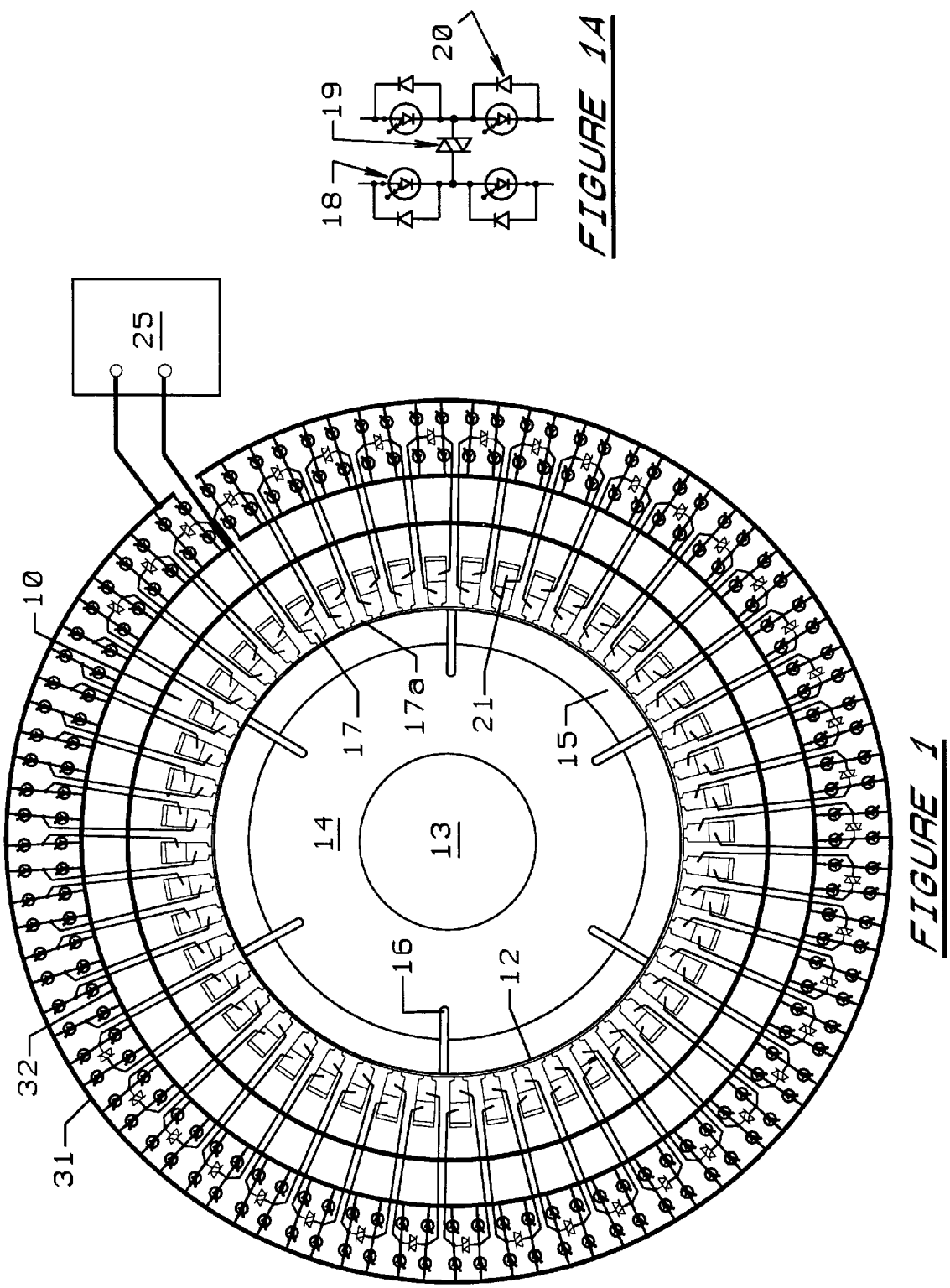

PERMANENT MAGNET DIRECT CURRENT (PMDC) MACHINE WITH INTEGRAL RECONFIGURABLE WINDING CONTROL

RELATED APPLICATION

This application is a continuation-in-part of my prior provisional application no. 60/024,645, files Aug. 22, 1996 and entitled Permanent Magnet Direct Current (PMDC) Motor With Integral Reconfigurable Winding Control.

BACKGROUND OF THE INVENTION

All commercial brushless, permanent magnet direct current motors known to date operate from external variable voltage, variable frequency sources. The air gap fields produced by permanent magnets cannot be externally controlled such that back electromotive forces (back-emf) of stator windings are strictly functions of speed. As the back-ends of the motor windings increase with rotational speed, winding currents and, thus, torque capacities decrease. Then the source voltage must be increased to force current against back-emf in order to produce the desired torque.

The amplitude of the air gap field in a PM motor is practically constant under normal operating conditions. As the rotor speed increases, so does the back-emf of the motor windings. Consider the following relationships:

$E_{dc} - i R_w - L_w di/dt - E_{bemf} = 0$, where $E_{dc}$ is supply voltage, $E_{bemf}$ is back-emf voltage, i is winding current and $R_w$ and $L_w$ are winding resistance and inductance. Disregarding the inductance term for steady state conditions and solving for winding current:

$i = (E_{dc} - E_{bemf})/R_w$, and considering that motor torque $T = Blir$ where B is air gap field density, l is the length of winding wire coupling the field B, i is winding current and r is the air gap radius. As the rotor speed increases, so does the back-emf voltage resulting in reduction of winding current if the supply voltage is constant. Thus, with constant supply voltage, the torque is reduced as the winding current is reduced with increasing rotor speed. To overcome this limitation in torque, power converters driving present PMDC motors must boost the output voltage to the winding or selectively switch the winding ON in areas where the field coupling is weak, as used in designs that do not have uniform air gap fields. This increases the complexity and robustness of the motor controller and the degree of voltage stress and heat generation concentrated in the controller power semiconductors. The switching components must then have high voltage ratings as well as high current ratings.

It is practically impossible to have perfectly uniform and balanced air gap field intensities and distributions produced by permanent magnets. This condition, combined with the high rates of change of magnetic coupling caused by switching distributed phase windings cause several undesirable parasitic effects. The most objectionable of these effects is torque pulsations or torque ripple. With trapezoidal or asymmetrical air gap field distributions and phase current waves spanning the pole pitch, PMDC machines have large components of space harmonics. Those harmonics induce circulating currents in the rotor and high core losses in the stator. Therefore, undesirable losses composed of hysterisis and eddy currents take place in the rotor and the stator core. To overcome those parasitic effects, technologies involving pulse width modulation, multi-level power converters or power conditioners are used to make the controller outputs closer to sine waves. This limits the utilization of magnetic core circuits in those motors to approximately 60 percent. The following references address the problems cited above for motors driven by external variable voltage, variable frequency power converters:

- IEEE Conference Paper, Titled: Performance Analysis of Permanent Magnet Brushless DC Motor, Authors: Miraoui, A.; Lin DeFang; Kauffman, J. M.
- IEEE Transactions on Industrial Electronics, VOL 43, No. Apr. 2, 1996, Titled: Identification and Compensation of Torque Ripple in High-Precision Magnet Motor Drives, Authors: Holtz, Joachim and Springob, Lothar.
- 1994 Institution of Electrical Engineers, Title: Adverse Electrical Phenomena in Rail Traction Using Alternating Current Motors, Authors: Minalescu, D. and Pantelimon, M.

SUMMARY OF THE INVENTION

My machine concept uses an innovative approach to deal with back-emf. It uses an electronic commutator arrangement that reconfigures the windings from series to parallel combinations to reduce the rate at which back-emf increases with speed. Windings that couple different poles are reconfigured by changing the number of coils connected in series between the positive and negative terminals (line-to-line) of the power source. If in one winding the number of coils connected in series line-to-line is reduced, the remaining coils in the same winding remain connected in series as a separate coil set and are reconnected in parallel with the first set. That is, considering the back-emf of each coil, the resultant back-emf is lower for fewer coils connected in series at any speed. This may be deduced from the circuit equations in the previous section. This allows enough winding current to flow to maintain high torque capacity at higher speed. Then the voltage delivered to the windings may be constant and selectable at the most convenient value to support the required machine performance. Consequently, my machine concept uses direct current without need for external power converters.

My optimum configuration is in a radial or cylindrical air gap geometry that allows for the highest torque arm in any given volume. My new machine uses high energy magnets to produce a uniformly distributed air gap flux density that works near the saturation induction limit of the stator core material, and uniformly distributed winding currents to result in high torque densities. This way maximum energy is stored in the air gap and utilized without the parasitic effects identified in the Background of the Invention. This way my machine concept utilizes core magnetics to better than 90 percent compared to the 60 percent limit identified above for prior PMDC machine technologies. The use of concentrated slot winding coils precludes pulsating torques as will be explained in the Detailed Description. My concept consists of a field rotor with permanent magnets and a stator armature composed of multiple windings with integral insulated gate bipolar transistor (IGBT) or MOS controlled Thyristors (MCT) and rectifier diode control. The electronic commutation controller is physically integrated with the machine because of the many winding connections to the power control modules and because the control modules are very simple and compact in design. Each winding coil is concentrated in two slots, the first slot has a position relative to a magnet pole (positive or negative) and the second slot has the same relative position to an adjacent magnet pole of opposite polarity as the first. Therefore each slot produces a torque on the rotor shaft in the same direction as the other slot of the pair.

At any given point in time, the flux of each magnet pole passes through all windings covered by the pole, except at the point of transition between poles, which is a short duration event. This results in steady or continuous potentials and current flows through most of the windings. That is, each winding spends most of the time under a practically nonchanging magnetic influence. Only one winding per pole is switched to commutate polarities. In a machine with, say, 10 windings per pole, this results in 10 percent of the switching energy that would exist if the entire pole were commutated. Core losses are also reduced by the small field coupling presented by switching one winding out of many. Thus, this concept has lower core losses and electric conduction losses than prior technology PMDC machines. Under continuous motion conditions, this system can be self-commutating. Therefore, the machine effectively operates in a steady state condition. The dc ripple for such machine is practically zero, with extremely low electromagnetic noise or power line distortion and practically zero torque pulsations.

Multiple reconfigurable winding switching control inherently permits many different modes of operation such as forward and reverse motoring, co-generation, dynamic braking, torque control, rotational speed control, and rotor angular control. No external power electronics components are needed with attendant space and weight savings. The individual current ratings of the large number of IGBT or MCT switches used are a small fraction of the equivalent full phase devices. The forward drop of the smaller devices is, then, lower resulting in lower conduction losses. Winding and switching device interconnections are configured to block flow of any possible circulating currents. Besides control flexibility, the multiple, separately controlled winding configuration makes the machine highly resistant to failures. The distributed ampere-turn configuration of the windings combines with the thermal capacity of the many switches (IGBTs, MCTs and rectifier diodes) for increased dissipatory and thermal capacity. Result is better tolerance of current surges or faults than that of concentrated windings and semiconductor devices. This was verified by tests of a prototype of the concept by exposing the machine to bolted faults (lowest fault impedance, of maximum current) at the output terminals without damage. In addition, failure of a single winding or semiconductor results only in a very small reduction of machine capacity. Machines with distributed windings would be disabled by such failures. The switching devices are not exposed to voltage stress conditions because the reconfigurable winding concept enables the machine to operate at a constant voltage that is selected to be comfortably well within the ratings of the switching components. This concept can be developed into a family of drives and actuators to serve applications ranging from standard auxiliary, propulsion or traction drives to high torque motion controllers and actuators.

BRIEF DESCRIPTION OF THE DRAWINGS

FIG. 1 is a schematic cross-section of my new machine and controller.

FIG. 1A is a schematic of a typical power control module of the machine of FIG. 1.

DETAILED DESCRIPTION

Figure 3A:
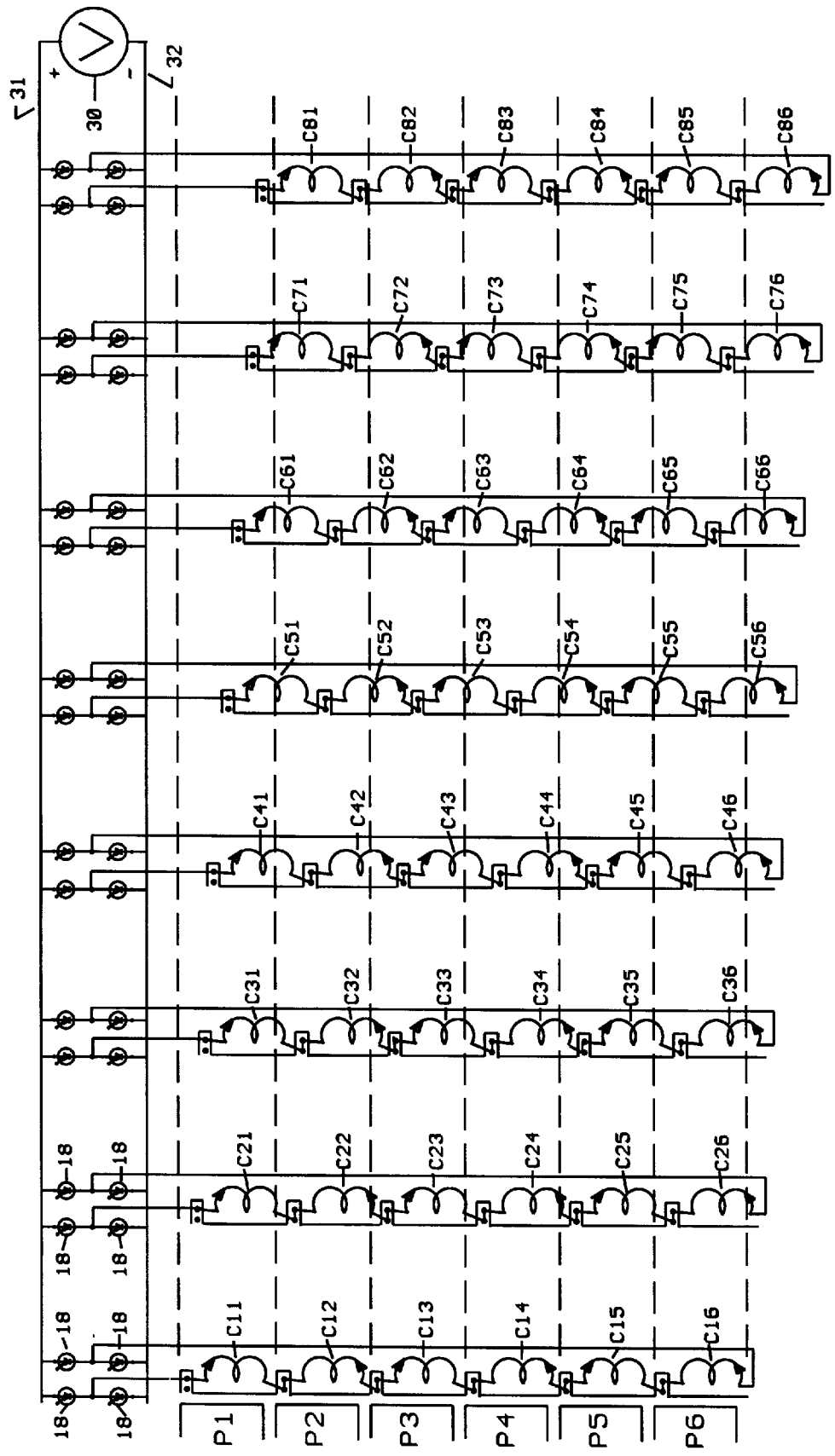
FIG. 3A is a schematic of the power controller with some components not shown and winding configurations during startup and low speed operation.

I will first describe the various parts, per se, and later describe the system in more detail. A slot path as used in this specification, and the claims, is hereby defined as a circuit including a group of stator coils in slots, which slots are angularly displaced from each other by the angular width equal to 360 degrees divided by the number of poles; there being as many such slots in a slot path as there are poles on the rotor. The new machine has a stator core 10, supported on a frame or casing 11 and contiguous with air gap 12. There are stator slots 17 separated by stator teeth 17a. The rotor may include a shaft 13, a rotor core 14 and a series of magnets 15. As is well known, there may be a sleeve (not shown) around the outside surfaces of the magnets 15 to hold the magnets in place notwithstanding centrifugal forces. The positive pole of each magnet 15 is adjacent to the negative pole of each adjacent magnet 15. Separating each magnet 15 from its adjacent magnet 15 is a rotor slot 16. The rotor slots 16 may be filled with any nonmagnetic material (including air). There are 48 winding coils 21 (FIG. 1) identified by reference numbers such as C11 (FIG. 3a). There are, for example, eight winding coils per pole and the illustrations assume that there are six poles although any suitable number of winding coils and/or poles may be used. There are in this example 48 stator slots 17. Thus, in this example there are eight slots per pole. The numbers of stator slots 17 will vary for different machine designs. The windings are energized by solid-state control modules (24) depicted in FIG. 1A, which are supplied from positive 22 and negative 23 ring buses and a terminal block 25. The terminal block 25 provides a suitable place to connect the electric machine to an external circuit for input (motoring) or output (generation).

FIG. 3A shows the circuit used during startup and/or low speed operation. I call this Control Mode 1. In this mode all coils in each slot path are in series with the solid-state switches 18. For any given slot path, any pair of complementary coils such as C11 and C12 for example, are either wound in opposite directions or are reverse connected, so the torques that they produce are in the same angular direction. For example, in FIG. 5, coils 21A and 21B correspond to coil C11 and C12 in FIG. 3A and are wound in opposite directions or reverse connected. As shown in FIGS. 1A, 2, 3A and 3B, isolation triacs (IT) 19 interconnect the switches 18 in the power control modules between winding coils in each slot path. When the machine speed increases the various winding coils of FIG. 3A are automatically reconnected to form the circuit of FIG. 3B, as will be explained later in more detail.

Figure 5:
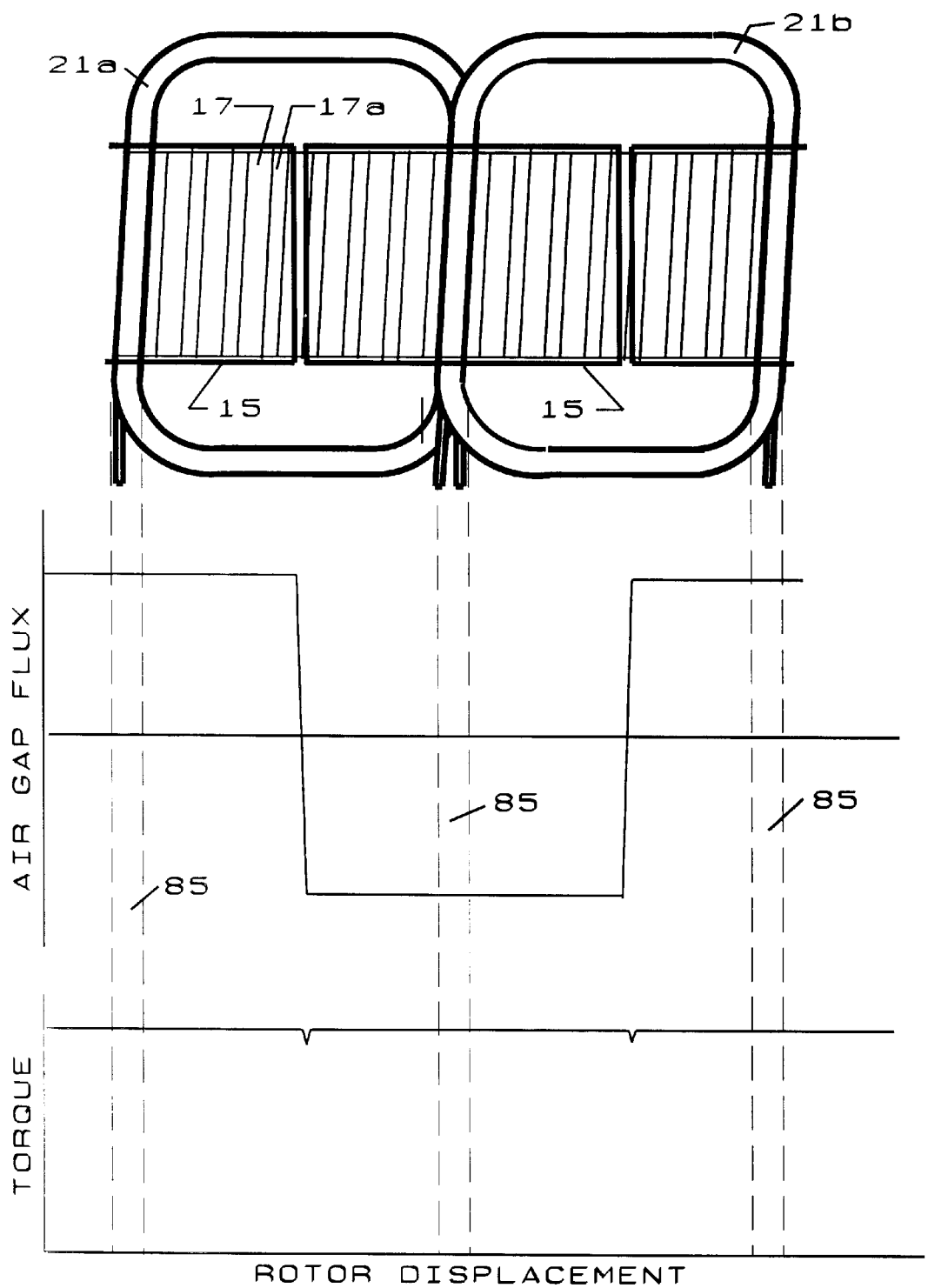
FIG. 5 illustrates the air gap field coupling concentrated slot coils in my new concept.
Figure 6:
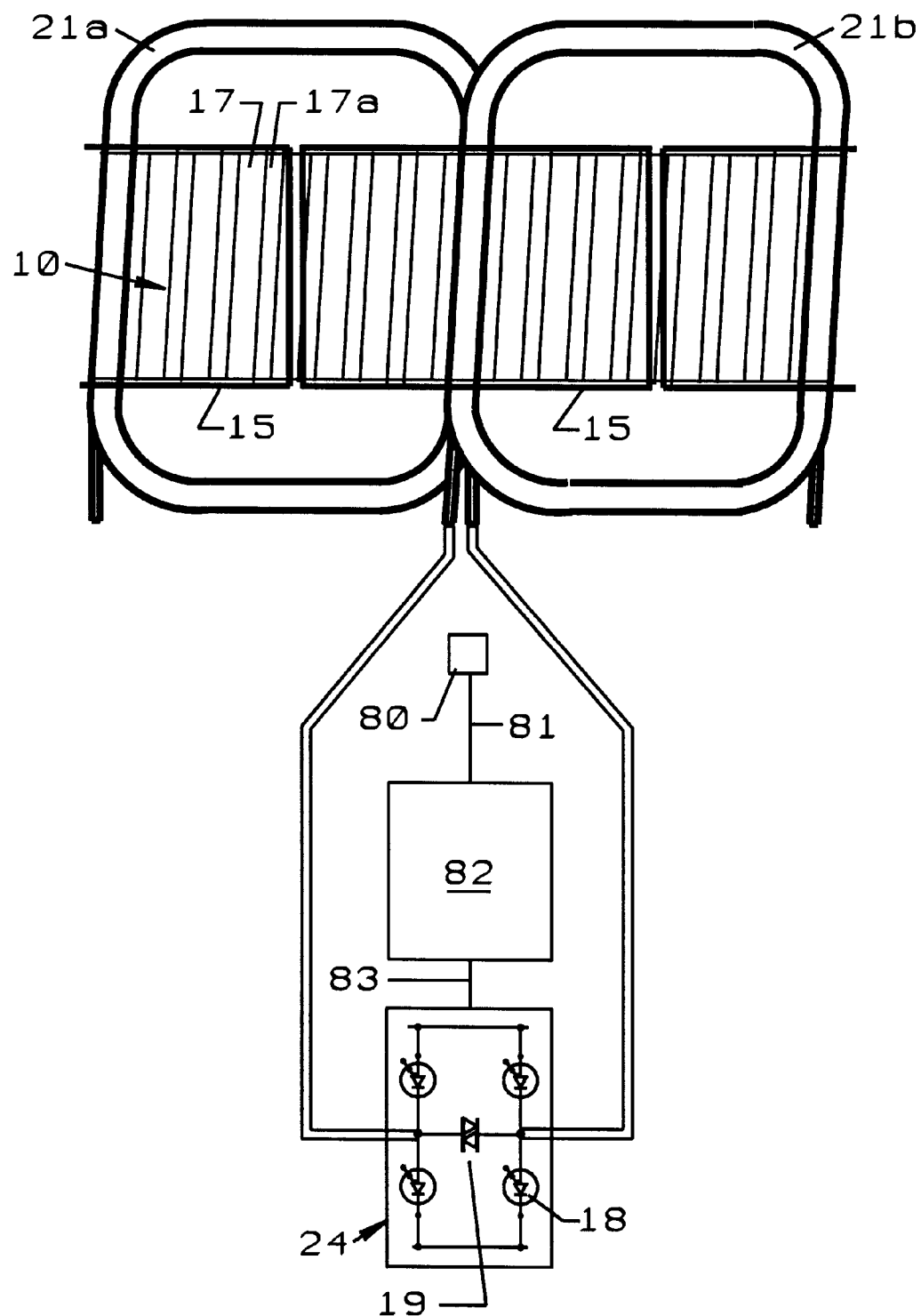
FIG. 6 shows an elementary winding control diagram.

The PM rotor, 14, 15, 16, has a substantially uniform magnetic flux distribution of a magnitude near the saturation induction limit of the stator core material 10 to achieve maximum torque at any speed. That is, T=Blir relies on a substantially uniform air gap flux density B for the entire effective air gap area to achieve maximum torque T for any value of current i. To produce a substantially uniform air gap field I prefer to use arcuate magnets 15, surface mounted on a cylindrical rotor core 14 to produce the highest achievable air gap flux density. The flux density in the stator core, measured in the teeth 17a contiguous to the air gap, should be near to (at least about 80 percent of) the saturation induction limit of the core material used. To produce an even distribution of flux lines across the face of each magnet pole 15, I take three measures: cut deep radial slots 16 in the rotor core between positive and negative magnets 15, select a ferromagnetic material of low relative permeability, such as silicon steel for the rotor core 14 and select a ferromagnetic material of high relative permeability, such as grain oriented silicon steel or HiperCo for the stator core 10. This is done to minimize the differences in reluctances between the longer magnetic flux paths through the centers of the between magnets 15 to result in events at the edges between magnets 15 to result in even flux distributions across the faces of the magnets 15 in the air gap 12 and stator core teeth 17a. As an example, the machine stator and rotor cores 10, 14, shown in FIG. 1 have the above geometry and other typical features that work well with my machine concept. Those are 6 rotor magnet poles 15, and 48 stator slots 17, each slot containing a concentrated double winding 21 as shown in FIG. 6 that results in 8 windings per pole. FIG. 5 shows the outline of a concentrated slot winding coil, also known in the art as a double layer lap winding. The number of windings and slots could be increased or decreased depending on the required torque capacity and space constraint.

At any given point in time, the flux of each magnet pole 15 passes through all of the many windings (such as C11) covered by the pole, except for the short period required to switch the polarity of each winding or winding set as will be explained below. This results in steady or continuous potentials and current flows through most of the windings. There are eight slot paths in the embodiment shown. Each slot path is continuously energized, however, at the point of transition between two adjacent magnets during field reversal coincident with the angular position of the slot path, the module 24 (FIGS. 1A and 6) acts temporarily to reverse the direction of the current in the slot path. For example, in FIG. 6 a magnetic sensor 80 detects the passage of the magnet pole and produces a signal that the controller 82 uses to control commutation. Thus, the controller triggers the switches 18 in the module 24 to act as a double-pole-double-throw switch to reverse the direction of the current through the slot path. This reversal occurs when the space between adjacent magnets 15 passes the sensor 80. Only one winding per pole is switched to commutate polarities. In a machine with eight windings per pole, this results in 12.5 percent of the switching energy that would exist if the entire pole were commutated. Note that the winding is switched in a very short time with near zero net energy change per pole. The collapsing flux linkage with the winding at the time (or position) of transition between magnet poles induces an opposing or canceling current, thus resulting in conditions for soft switching with minimum voltage overshoot and minimum switching energy loss. Therefore, the machine effectively operates in a steady state condition. The dc ripple for such a machine is practically zero, with low electromagnetic noise and practically zero torque pulsations. This minimizes parasitic effects.

In a PM machine it is practically impossible to have perfectly uniform and balanced air gap field intensities and distributions. With multiple concentrated slot windings, if the air gap fields passing through individual windings are different, the corresponding back-ends change proportionally causing winding currents to change inversely. Then the products of field fluxes B and currents i in Torque=Blir remain constant resulting in constant torque. See FIG. 5, which illustrates the narrow band of field coupling 85 produced by the coils concentrated in slots. This does not happen with windings distributed over the entire pole pitch and is the reason for inherent freedom from pulsating torques in multiple concentrated slot windings. Clogging torques that could be caused by the reluctance of stator core slots are eliminated by putting a skew in the stator core. Winding and switching device interconnections are configured to block flow of any possible circulating currents that could also result in torque pulsations and core losses.

Figure 1B:
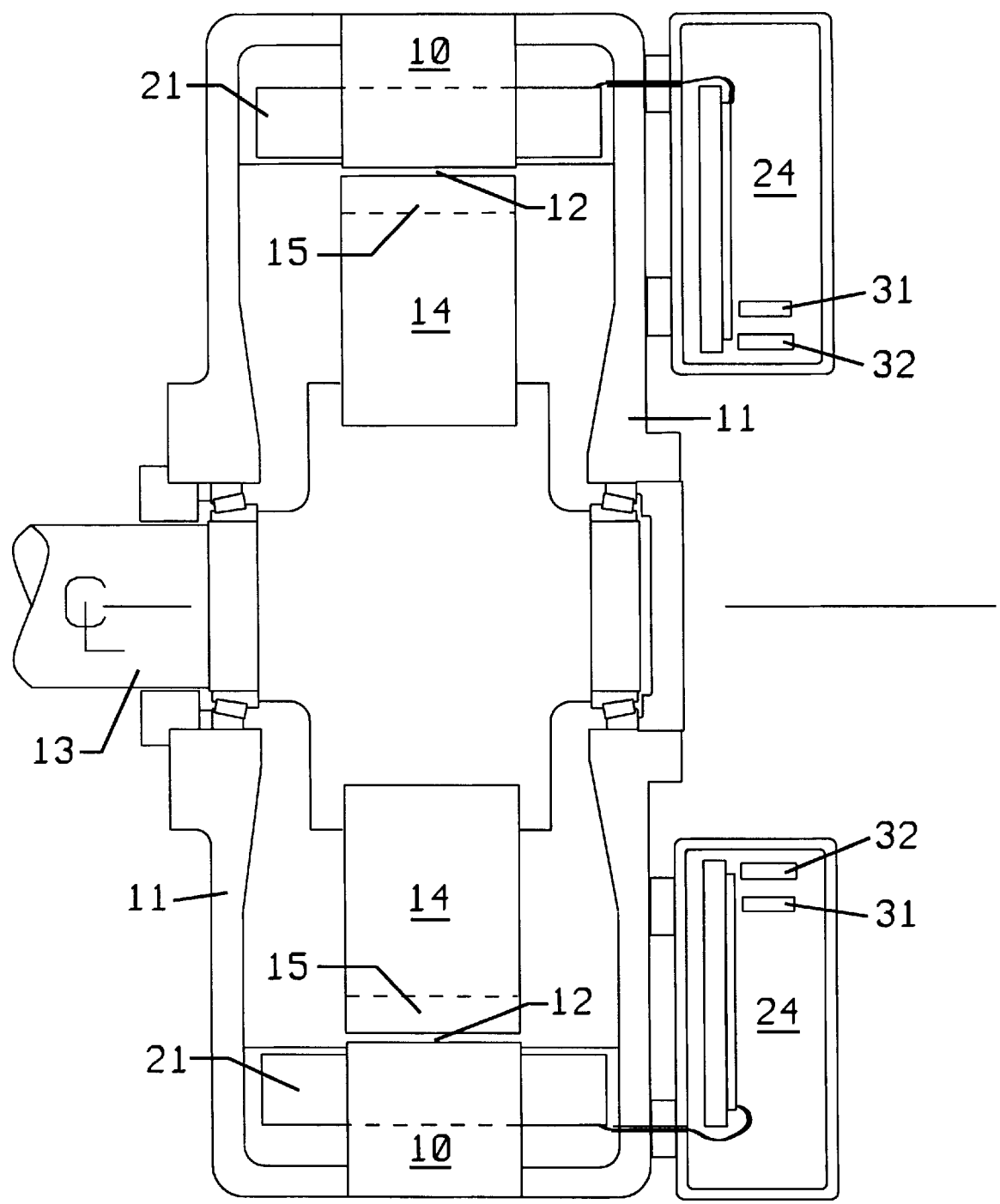
FIG. 1B is a vertical cross-section of my new machine.
Figure 2:
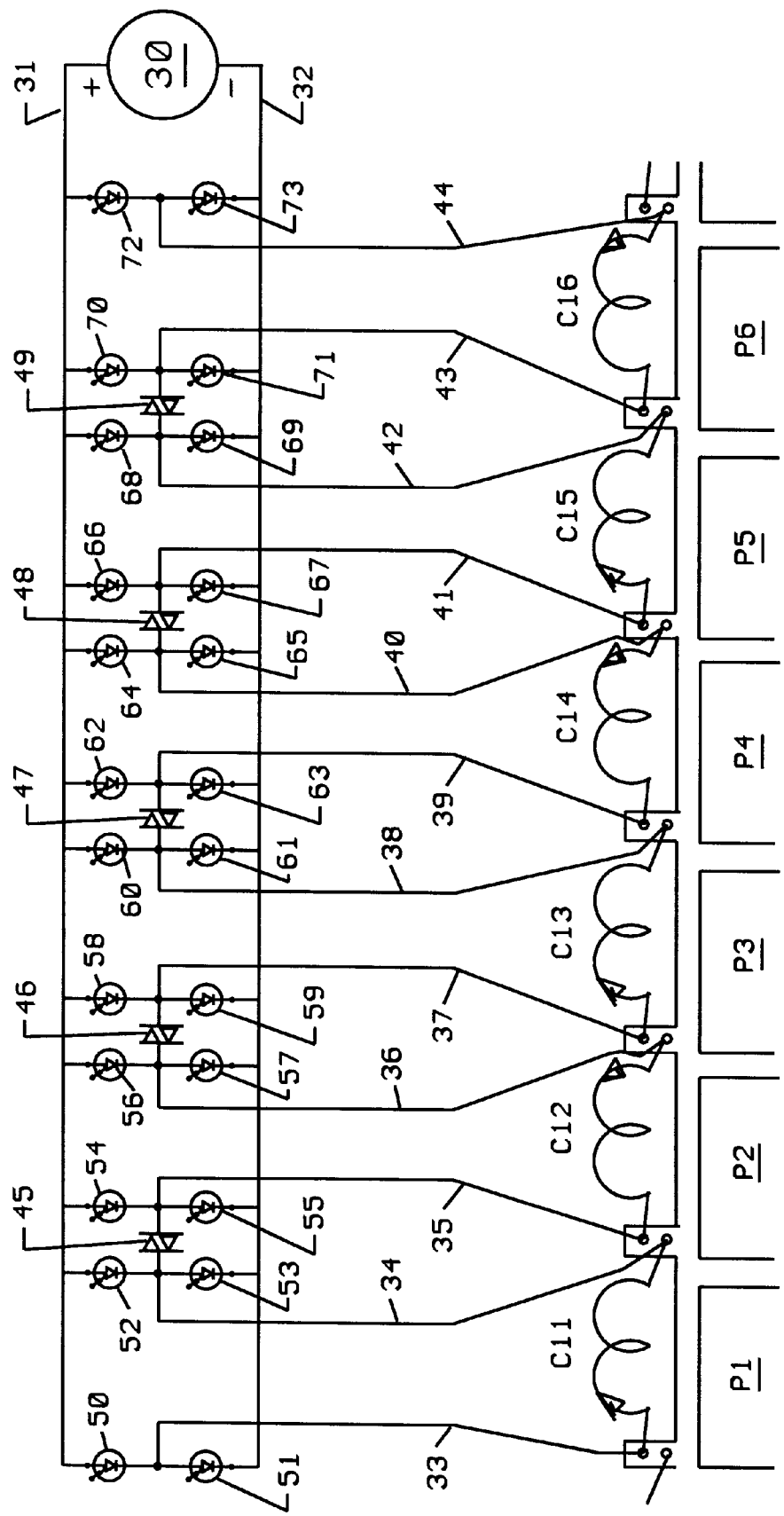
FIG. 2 is a simplified schematic of the power controller that shows all power components in a typical winding slot path.
Figure 3B:
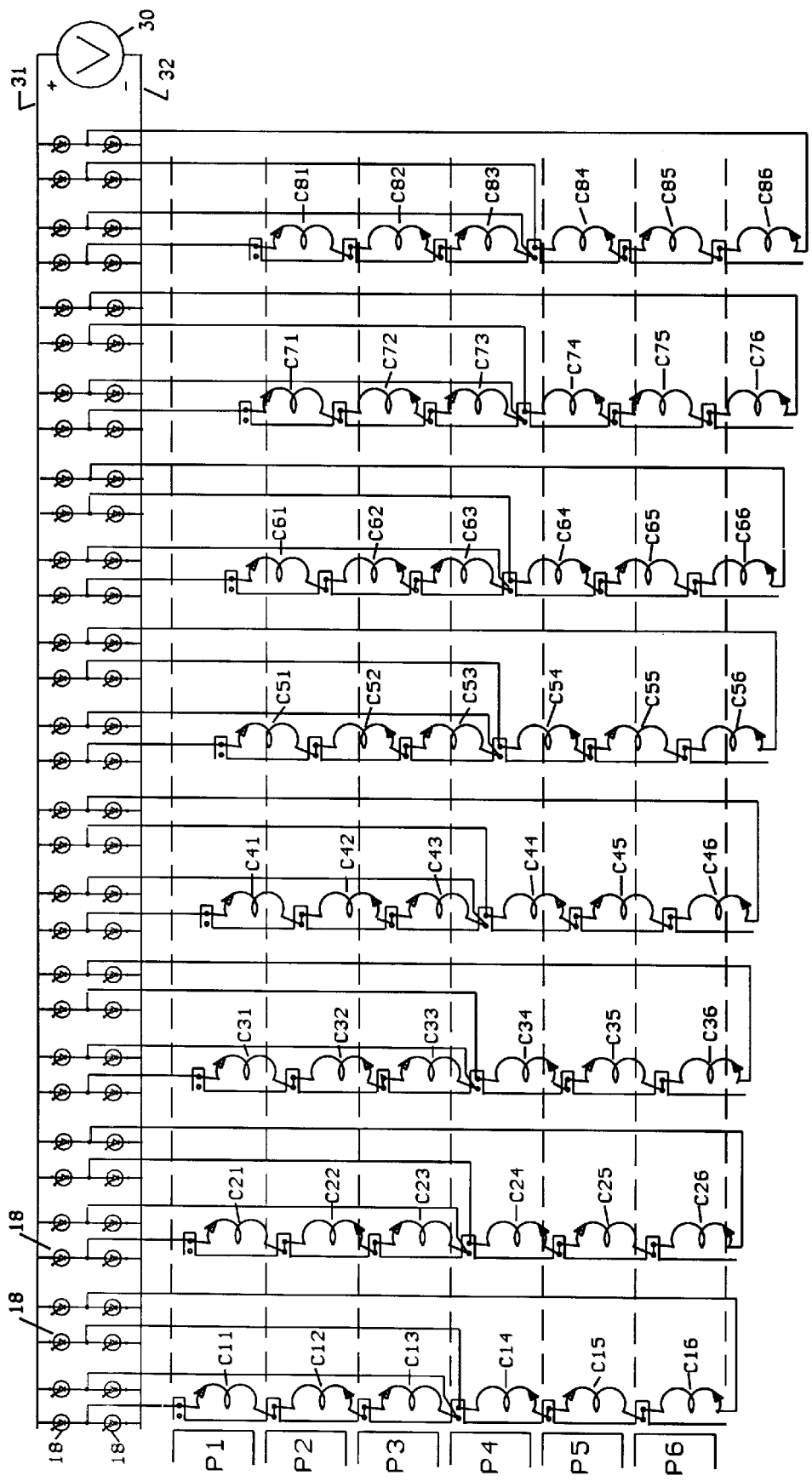
FIG. 3B is a schematic of the power controller with some components not shown and winding configurations during high speed operation.

FIGS. 1, 3A and 3B show an example of the machine winding control system. The switches 18 in FIGS. 2, 3A and 3B and the isolation triacs 19 of FIG. 2 perform the function of reconfiguring the winding control circuit of FIG. 3A to that of FIG. 3B as the machine speed increases. When the windings are connected as shown in FIG. 3A, the machine is in Control Mode 1 and when connected as in FIG. 3B, the machine is in Control Mode 2 as will be described in detail below. These switches 18 and isolation triacs 19 also change from FIG. 3B (Control Mode 2) to FIG. 3A (Control Mode 1) as the machine speed decreases. The control wire 81 of FIG. 6 has a pulse rate produced by sensor 80, proportional to the speed of the rotor 13, 14, 15. Using that information as an input, the control 82 may switch modes based on speed and/or on rotor position, if and when the sensor 80 is installed in the same angular position as a stator slot 17. Other sensors or transducers can also be added, along with the attendant control logic to enable the control 82 to reconfigure the machine in response to other parameters, such as torque and winding current or to provide redundant sensing. The control logic can be made to control many optional operating modes such as dynamic braking or manual override and to provide automatic, supervisory protective features such as prevention of overspeed. FIG. 2 shows the windings in a single stator slot path traversing all six poles of the machine. In FIGS. 3A and 3B winding coil designations are preceded by the letter C, followed by the slot path number and the pole number assuming a position of the rotor such as shown in FIG. 1. So, C11 is the coil in slot path 1, across pole 1. Each winding coil is concentrated in two slots as shown in FIG. 5, one in front of a positive pole and one in front of a negative pole, both in the same relative position to each pole. Alternate windings in any given slot path are reverse connected to result in tangential forces in the same direction under the influence of opposite poles. The switching configuration is a special "H" bridge 24 made up of a power semiconductor module fitted with MCT or IGBT switches 18, free-wheeling or regenerative rectifier diodes 20 and an isolation triad 19. Each winding coil or coil set is commutated in the appropriate direction by integral, pole position sensing and control circuits as explained above.

A hybrid series/parallel coil arrangement is defined as a system in which there are groups of coils in series with others, with the groups in parallel. For example, the coil arrangement of FIG. 3B is a hybrid series/parallel coil arrangement. To explain further, assume that there are six coils per slot path. These six coils could be configured in either of two hybrid series/parallel coil arrangements, thus: There could be two groups of coils with three coils in series per group, the two groups in parallel. Secondly, there could be three groups of coils with two coils in series per group, the three groups in parallel.

For simplicity, the term "switch" refers to IGBTs, MCTs and/or rectifier diodes as used in the "H" bridge modules 24 shown in FIG. 1A. Free-wheeling or regenerative rectifier diodes 20 are standard components used in the control of inductive circuits to provide a coil discharge bypass and prevent damage that may be caused by reverse overvoltages under switching conditions. Isolation triacs (IT) 19 are used to either interconnect coils in a series configuration or isolate groups of coils to result in parallel configurations. ITs cannot switch currents off. Switching is done by the IGBTs or MCTs and rectifier diodes only. ITs turn off after the switches have turned coil currents off, depending on the control condition. The switches 18 in the same leg of the H bridge 24 are "bootstrapped" at the control module so that only one switch 18 can be ON at a time to prevent short circuiting the supply bus. Note that the extreme left and extreme right switches 18 are in single winding slot path arrangements without isolation triacs 19. Thus, the winding arrangements are open-ended to block any possible circulating current flows. Examples of basic control circuit functions are illustrated in FIGS. 3A and 3B. The control system effectively manages torque and current by two means: by the number of parallel winding slot paths energized and by management of back-emf.

The first means by which the control system manages torque capacity is by the number of slot paths energized in parallel through switches 18. At any speed, minimum torque condition exists if only one path is energized and maximum torque exists if all paths are energized, intermediate torque conditions achievable by energizing fewer paths. The second means is by reconfiguring the winding arrangement in each path in series and parallel combinations to compensate for reduction in winding currents caused by increasing back-emf as machine speed increases. The coils traversing the six poles of each slot path in the machine used as example can be configured in (1) Control Mode 1, one series group as in FIG. 3A, (2) Control Mode 2, two series groups of three coils as in FIG. 3B, the two groups connected in parallel, (3) Control Mode 3, three series groups of two coils each, the three groups connected in parallel and (4) Control Mode 4, six coils connected in parallel. This results in four reconfiguration modes, each with a speed range dependent on back-emf. See FIG. 4. By reconfiguring the windings as described, my machine concept is capable of maintaining torque capacity with increasing speed while under constant or nonchanging input voltage. In contrast, prior art would require increasing voltage with speed to maintain torque capacity.

The following describes the circuit configurations for the first two control modes in detail. The third and fourth modes follow the same control logic. The functional features of all slot paths are identical, so the following descriptions using FIG. 2 are applicable to all slot paths. In FIG. 2, all of the switches 50, 51, 52, etc. are the same as switches 18 of FIG. 1A and isolation triacs (IT) 45, 46, 46, etc. are the same as IT 19 in FIG. 1A. The reason the same parts 18 and 19 have different reference numbers in FIG. 2 is that during explanations of the routing of the current from source 30 it is necessary to refer to different ones of switches 18 and ITs 19 by new reference numbers.

The slot path circuit is configured as follows for Control Mode 1 using FIG. 2, which shows all circuit components in a typical slot path, except for rectifier diodes 20. Starting at the positive terminal of the power source 30, to positive ring bus 31, to switch 50 (switch 51 "bootstrapped" OFF), to wire 33, to coil C11, to wire 34, to isolation triac (IT) 45 (switches 52, 53, 54, 55 OFF), to wire 35, to coil C12, to wire 36, to IT 46 (switches 56, 57, 58, 59 OFF), to wire 37, to coil C13, to wire 38, to IT 47 (switches 60, 61, 62, 63 OFF), to wire 39, to coil C14, to wire 40, to IT 48 (switches 64, 65, 66, 67 OFF), to wire 41, to coil C15, to wire 42, to IT 49 (switches 68, 69, 70, 71 OFF), to wire 43, to coil C16, to wire 44, to switch 73 (switch 72 "bootstrapped" OFF), to negative ring bus 32, to the negative terminal of the power source 30. Current flow is positive. When negative current flow is required, alternate polarity switches 50, 51 and 72, 73 change state. Therefore, Control Mode 1 conditions are summarized as follows. Slot path coils C11, C12, C13, C14, C15, and C16 in FIGS. 2 and 3A, across all six poles are in series. The extreme left switch 18 connected to the positive bus is ON ( negative switch in same leg is bootstrapped OFF) all ITs 19 (or 45, 46, 47, 48, 49) are ON (permissive) to connect all coils in the slot path in series and the extreme right negative switch 18 is ON (positive switch in same leg is bootstrapped OFF). All switches 52 to 71 in intermediate H bridges are OFF, thus forcing current from positive to negative bus through all slot path coils connected in series through the ITs 45, 46, 47, 48 and 49.

The slot path circuit is configured using FIG. 2 as follows for Control Mode 2, where three coils are connected in series, the coil set energized in parallel with the other three coils, also connected in series. Starting at the positive terminal of the power source 30, to positive ring bus 31, to switch 50 (switch 51 "bootstrapped" OFF), to wire 33, to coil C11, to wire 34, to isolation triac (IT) 45 (switches 52, 53, 54, 55 OFF), to wire 35, to coil C12, to wire 36, to IT 46 (switches 56, 57, 58, 59 OFF), to wire 37, to coil C13, to wire 38, to switch 61 (IT 47 OFF and switch 60 "bootstrapped" OFF), to negative ring bus 32, to the negative terminal of the power source 30. This completes the first series connected coil set. Also starting at the positive terminal of the power source 30, to positive ring bus 31, to switch 62 (switch 63 "bootstrapped" OFF), to wire 39, to coil C14, to wire 40, to IT 48 (switches 64, 65, 66, 67 OFF), to wire 41, to coil C15, to wire 42, to IT 49 (switches 68, 69, 70, 71 OFF), to wire 43, to coil C16, to wire 44, to switch 73 (switch 72 "bootstrapped" OFF), to negative ring bus 32, to the negative terminal of the power source 30. Current flow is positive through both paralleled coil sets. When negative current flow is required, alternate polarity switches 50, 51, 60, 61 and 62, 63, 72, 73 change state. Therefore, Control Mode 2 conditions are summarized as follows. Half of same slot path coils to be connected in series, one coil group in parallel with the other half in the same slot path as shown in FIG. 3B, the IT 47 in the middle H bridge is OFF (isolating), the left negative switch 60 in the H bridge is ON and the right positive switch 63 on the same bridge is ON. This results in three series connected coils, C11, C12 and C13 energized in parallel with the next three series connected coils, C14, C15 and C16, in the same slot path.

Figure 4:
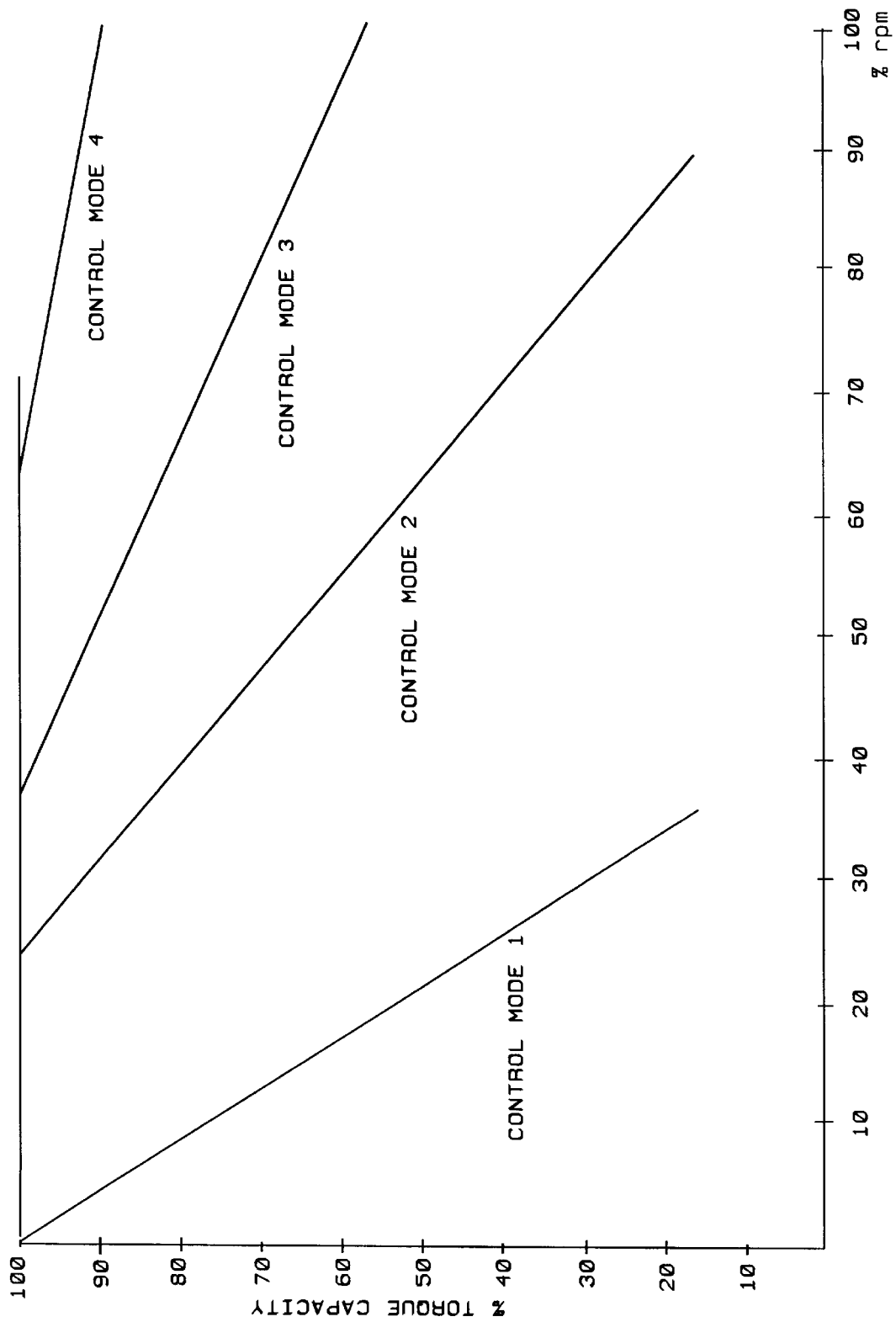
FIG. 4 is a typical torque-speed performance characteristic.

The logic for this arrangement and control scheme follows. For machine startup, coil current is only limited by the resistance of the windings and by the supply circuit transfer impedance. To limit the starting current and its duration, all winding slot paths are energized in Control Mode 1 where all slot path coils are in series for maximum starting torque, but with maximum series resistance. This limits starting or "locked rotor" current to within the capacities of switches and windings and is depicted in FIG. 3A. This also results in high rotor acceleration with quick buildup of back-emf and attendant reduction in coil current. As the speed increases while the machine is still in Control Mode 1, back-emf causes a reduction in torque capacity as described above and shown in FIG. 4. If the torque needs to be held at a high value, the control system automatically shifts some or all of the coil groups to Control Mode 2, thus reducing back-emf per series group by one half and allowing the coil current to increase toward the initial level. If the torque still needs to be held at a high value, the third and fourth control modes automatically come into effect, further reducing back-emf to one third and to one sixth (the back-emf of a single coil), again allowing the coil current to increase toward the initial level. In the fourth or, generally, the last control mode all isolation triacs, IT 45, 46, 47, 48, 49 in FIG. 2 are OFF, whereby the switches in the associated modules 24 connect all slot path coils in parallel. This extends the maximum torque capacity of the machine to the upper speed range while operating with constant driving voltage. This control scheme results in a torque/speed performance profile that can be tailored to the specific machine application without restriction, as illustrated in FIG. 4.

Finer resolution of the torque/speed characteristic profile is made possible by the number of energized winding slot paths and hybrid series/parallel combinations capable of spanning between the maximum torque capacities of the control modes. In the machine depicted in FIG. 1 as an example, torque/speed resolution can be as low as 2% around an 80% total load level if the windings in one slot path are energized in the first, second or third control mode while all other slot paths are energized at the fourth mode. At very low speed, all windings operating in the first control mode, the lowest resolution for this example would be 12.5%. Lower resolution at low speed may be achieved by lowering the supply voltage level or by proportioning the number of turns of the windings in one or more slot paths to result in lower resolutions. That is, to result in higher back-ends and/or lower ampere-turns for lower fractions in torque increments. The upper range of torque/speed performance is only limited by thermal considerations and the structural integrity of the rotor. Most of the internal losses of the machine are stator core losses that increase with speed.

Dynamic or regenerative braking or continuous generator action are effected by reversing the described control process by downshifting control modes. That is, if at a given speed more coils are switched in series, their combined back-ends exceed the supply voltage resulting in reverse power flow into the source. If insulated gate bipolar transistors (IGBTs) are used, all IGBTs in the control modules of each slot path are reverse biased, thus turning the H bridges into rectifiers oriented to allow reverse current flow into the power source without exceeding the continuous current capacity of existing free-wheeling diodes 20. If MOS controlled thyristors (MCTs) are used, full capacity rectifier diodes take the place of free-wheeling diodes 20, reverse connected in parallel with the MCTs to allow reverse current flow into the power source. This feature enables my machine concept to change from motoring to power generation practically instantaneously, which would be useful for an energy storage (flywheel) system and a traction or propulsion drive. This machine concept may be applied to power generator design to achieve freedom from the parasitic effects described in the Background of the Invention.

Commutation of the switches 18 takes place as the coil coupling the air gap fields of the moving poles enter transitional zones between polarities. Several options are available to accomplish this, whether it is a position sensing system, Hall generator based magnetic sensors or by using the coils as coupling detectors. See FIG. 6. The collapsing field flux linkage with a coil at the point of transition between magnet poles induces a current in opposition of the winding's load current with a canceling effect. This can be detected by a current monitoring circuit. When the net coil current approaches a zero level resulting from this canceling effect, the same circuit can generate a null signal to trigger commutation of the switches 18 in the control module 24. For machine startup a position sensing system or magnetic sensors must be used. I prefer to use a special Hall based magnetic sensor of my development. This sensor, when installed coincident with the angular position of a coil, can detect the polarity of the magnet engaging the coil to control the initial direction of current flow at startup, resulting in forward or reverse rotation; and the exact transitional point of reversal of polarity under dynamic conditions to control commutation. The number of magnetic sensors used must be equal to the number of slot paths (eight for the example in FIG. 1). A redundant pair of sensing systems of different characteristics should be used to ensure against common mode failures for acceptable reliability. The above magnetic sensors and coil null current detectors are examples of redundant sensing systems that can be used for this purpose. The performance of the sensing and control system may be tested in a virtual prototype computer model of the integrated machine and control.

The control logic in controller 82 of FIG. 6 can incorporate automatic, supervisory protective features as explained above. An automatic current limiting control feature may be provided to protect the motor windings and control modules. That is, if the coil current slew rate exceeds a preset level or the speed goes below a preset level for each control stage beyond first, the control automatically downshifts to a lower control mode to reduce coil current to within rated capacity. If the current slew rate continues to exceed the above preset level after downshifting, all of the control module switches in the affected slot path remain off in a lockout condition. That is, all coils in the affected slot path are deactivated as an integrated protective function. The above protection and control features can make use of commercially available integrated circuits and components such as MCTs by Harris Semiconductor and IGBTs by Powerex and Hitachi.

Control systems for controlling all aspects of the operation of electric motors and generators are old and well known. A control system to control almost all aspects and functions of any given new or old type of motor is well within the skill of the art. Therefore, a control system can be provided to control the various switches of my invention. To apply such a control system to the present invention, it is simply necessary to control the various switches such as 18, 50, 56, 61, 69, 73 in a way as to control the motor in any given way. Such a control system may sense the speed of the shaft 13 and use that speed as part of its control function. Thus, the motor can be controlled to shift in sequence from Control Mode 1 to Control Mode 4, or to provide a constant speed, or to provide a constant torque, etc.

I have described various modes including control modes and operating modes. Unless otherwise qualified, the word "mode" as used herein is generic.

I claim to have invented:

1. A permanent magnet direct current motor comprising:
   said motor having a stator element,
   said motor having a rotor element,
   said elements defining an air gap between them,
   poles, on said rotor, said poles comprising permanent magnets for providing magnetic flux across said air gap,
   said stator element having more slot paths, than there are poles on the rotor, each slot path having coils, and
   electrical conductors which when connected to a source of electricity will feed such electricity to said coils, said rotor element being rotatable about an axis, and the gross angular width of each slot path, as measured in a plane perpendicular to said axis, being small as compared to the gross angular width of said poles as measured in said plane.

2. A machine as defined in claim 1, having:

means for switching said coils into different configurations to provide a plurality of modes of operation of the machine, said switching means comprising means for reconfiguring at least some of the coils in at least one slot path to provide different modes of operation of the machine.

3. A machine as defined in claim 2 in which there are an even number of coils in a slot path, said switching means connecting all of the coils in a given slot path in series with each other and the entire group of such coils of that slot path across said source in one mode and a hybrid series/parallel coil arrangement across said source in another mode.

4. A machine as defined in claim 2 in which there are an even number of coils in each slot path, said switching means in one mode connecting all of the coils of each slot path in series with one other and in another mode connecting only half of the coils in said one slot path in series with each other.

5. A machine as defined in claim 2 in which, in one of said modes, the coils, in at least one slot path, are in a hybrid series/parallel coil arrangement.

6. A machine as defined in claim 2, comprising:

said switching means including means for connecting said coils in parallel to produce one of said modes.

7. A machine as defined in claim 2, in which said switching means has only a single on-off switch per slot path for effecting a reconfiguration of said coils.

8. A machine as defined in claim 1, comprising:

each pole providing flux to the coils of each slot path during each rotation of said rotor with a reversal of the flux through each coil whenever such coils receives its flux from a different one of said poles, and means for reversing the direction of current flow through each coil at substantially the same time that the flux through such coil is reversed.

9. A machine as defined in claim 8 in which said means for reversing reverses the direction through the coils of only one slot path at a time.

10. A machine as defined in claim 1, having at least two control modes and comprising: means for applying a voltage to said coils and maintaining said voltage substantially constant in at least two of said modes.

11. A machine as defined in claim 1, comprising:

said stator element comprising a core composed of magnetic material, said elements comprising means for holding the flux in said core near to saturation of said core except during the brief periods when the flux reverses direction during rotation of the rotor.

12. A machine as defined in claim 1, in which there is a sensor for each slot path that senses the position of said rotor and means responsive to said sensors for controlling the energization of said slot paths to cause the rotor to rotate.

13. A machine as defined in claim 1, in which there is a magnetic sensor, for each slot path, that senses the position and polarity of said rotor, and means for energizing said slot paths including means for switching the polarity of said slot paths by reversing the direction of the energization of said slot paths to effect rotation of said rotor.

14. A machine as defined in claim 1, in which there are at least several slot paths on said stator, and said electrical conductors including means for energizing all of said slot paths with the direction of current flow through said slot paths being reversed in only one slot path at a time.

15. A machine as defined in claim 1 in which said slot paths comprise means for minimizing pulsating torques of the machine.

16. The method of providing a permanent magnet direct current motor, comprising:

providing said motor with a stator, including a magnetic core, and a rotor, wherein said rotor and stator have an air gap between them, providing poles in the form of permanent magnets on said rotor for producing a field across said air gap, providing said core with more slot paths than there are poles on said rotor, providing each slot path with at least one coil in each slot of the slot path and passing direct current through said coils, positioning the coils of each slot path so that they receive flux from said poles which reverses direction each time a different pole passes flux through the coils of the slot path, and reversing the direction of current flow through a coil whenever the flux through that coil reverses itself.

17. The method of claim 16, comprising:

a first connecting step comprising connecting said coils In one configuration to provide one mode of operation of said machine, and a second connecting step comprising connecting said coils in another configuration to provide another mode of operation, said first connecting step comprising connecting more of the coils in each slot path in series with each other than in the second connecting step.

18. The method of claim 17, wherein each of said slot paths has an even number of coils and wherein one of said connecting steps comprises connecting, in one slot path, half of the coils of that slot path in series with each other to form a first group of coils and the other half of the coils of the slot path in series with each other to form a second group of coils, with said first and second groups of coils being in parallel with each other.

19. The method of claim 17, in which:

at least one of said connecting steps connecting the coils of at least one slot path in a hybrid series/parallel coil arrangement.

20. The method of claim 16, wherein said reversing step comprising reversing the direction of current flow through each given slot path at a different time, during one revolution of said rotor, than the time at which the currents in the other slot paths are reversed.

21. The method of claim 16, comprising providing two control modes and applying a voltage to energize said coils and maintaining that voltage substantially constant while the machine is running in all said modes.

22. The method of claim 16, comprising maintaining said field at near saturation level of said stator except during the brief moments during which the field reverses its direction.

23. The method of claim 16 in which the flux collapses when it reverses direction and, said collapse causing a reduction in the current flow through a coil of a slot path that links the collapsing flux and, sensing said reduction to effect said reversal of the direction of current flow.

24. A motor, comprising:

a stator, a rotor having a plurality of poles and an axis of rotation, said rotor and stator defining an air gap between them, said rotor having magnet means for providing a magnetic field through the air gap, first and second groups of coils on said stator each group having a coil at each of a number of positions on said stator with said positions being equally angularly spaced about said axis, each said group being angularly spaced about said axis from each other group, the number of said positions in each group being equal to the number of poles on the rotor, switching means for connecting said coils in first and second different configurations, the second of which will produce greater speed with substantially the same torque as the first, and control means responsive to a predetermined operating condition of said motor while the coils are in said second configuration for controlling said switching means to connect the coils in said first configuration.

25. A motor as defined in claim 24 in which said control means is responsive to the speed of the motor to change from one to the other of said configurations.

26. A permanent magnet machine comprising:

a stator element, a rotor element, said elements defining an air gap between them, a number of poles, fed by at least one permanent magnet on said rotor element for providing magnetic flux across said air gap, said stator element having a plurality of slot paths, each slot path having at least as many slots as there are poles on the machine, each slot path having a circuit with at least two coils in each slot of the slot path, and at least one switch for reconfiguring at least some of the coils in at least one slot path to provide different modes of operation of the machine.

27. A machine as defined in claim 26 in which there are only the same number of slots in any slot path as there are poles on the machine.

28. A machine as defined in claim 26 in which the two coils in any given slot are interconnected and are a part of the circuit of the slot path which includes the slot.

29. A direct current machine, comprising:

said machine having a rotor with poles and including means for providing said poles with magnetic flux, said rotor being rotatable about an axis of rotation, said machine having a stator, said rotor and stator defining an air gap between them, said stator having at least several slot paths, each said slot path having at least as many coils on said stator as there are poles on said rotor and also having coils equally angularly spaced around said axis of rotation, first and second conductors, each slot path having:

(a) its coils electrically connected together so that there is a path for current to flow from one end of one of said coils of the slot path to one end of another of said coils of the slot path, (b) a first connection from said first conductor to said one end of said one coil, (c) a second connection from said second conductor to said one end of said another coil, and (d) means for reversing said connections so that said first conductor is connected to said one end of said another coil and said second conductor is connected to said one end of said one coil.

30. A machine as defined in claim 29, in which:

each slot path being fed with flux from one of said poles with the flux to the slot path changing direction each time a different pole feeds flux to the slot path, said means for reversing causing a reversal of said connections to each slot path each time the direction of the flux through the slot path reverses.

31. A machine as defined in claim 30, in which said means for reversing reverses the direction of current through only one slot path at a time.

32. A machine as defined in claim 31 in which the number of slot paths on said stator is greater than the number of poles on said rotor.

33. A machine as defined in claim 29 in which said switching means comprises means for switching the coils of one slot path into one configuration and the coils of another slot path into another configuration.

34. A d.c. machine, comprising:

a rotor having poles and also having an axis rotation, said rotor also having at least one magnet for providing said poles with flux, a stator extending around said rotor, at least two sets of coils mounted on said stator, each said set comprising a number of coils mounted on said stator equal in number to the number of poles on said rotor, with the coils of each set equally angularly spaced around said axis of rotation, each said set being angularly spaced about said axis from all other such sets, and a power line having first and second conductors, each said set having first and second connections between the coils of the set and said power line for the transfer of power between the coils and the power line, each set including means for reversing its said connections thereby causing the coils of the set to apply a substantially continuous torque to said rotor.

35. A machine as defined in claim 34 in which the said means performs said reversal each time the rotor is at a predetermined angular position.

36. A machine as defined in claim 34 in which the said means of each set performs its said reversal at a different angular position of the rotor.

37. A machine as defined in claim 34 in which said means of a given set comprises means for effecting such reversals when said rotor is at the angular position wherein the flux through the set is reversing direction.

38. A machine as defined in claim 34 having switching means for changing the interconnections between the coils of at least one slot path to thereby change the performance of the machine.

39. A machine as defined in claim 34 in which said means comprises semi-conductors for effecting said reversal of said connections and also for changing the interconnection between the coils of the set to thereby modify the mode of operation of the machine.

40. A permanent magnet d.c. machine, comprising:

a rotor having poles and also having an axis of rotation, at least one permanent magnet for providing said poles with flux, a stator extending around said rotor, at least two sets of coils mounted on said stator, each said set comprising at least one coil in each of a number of positions wherein said number of positions is equal to the number of poles on said rotor and with the positions of each set equally angularly spaced around said axis of rotation, each said set being angularly spaced about said axis from all other such sets, and a power line having first and second conductors, each said set having first and second connections from said power line to the coils of the set, and also having additional connections between the coils, the said additional connections enabling the machine to operate in one mode when the coils are interconnected in one way and to operate in another mode when the coils are interconnected in another way, and solid state switches controlled by the rotation of said rotor for (1) reversing the direction of current flow through the coils of a set, and (2) switching from said first-named mode to the second-named mode by changing from said one way of interconnecting the coils to said second way of interconnecting the coils.

41. A machine as defined in claim 40 wherein the poles of the rotor move in sequence past any given coil with the flux through the coil passing through a transition whenever the pole that is feeding the flux moves beyond the coil and another pole begins to feed flux to the coil, and a sensor that senses said transition and controls at least one of said switches to effect said reversal of the direction of current flow.

42. A machine as defined in claim 40 including means for effecting said reversal through any given coil at each instant that the coil is between two poles.

* * * * *

UNITED STATES PATENT AND TRADEMARK OFFICE
CERTIFICATE OF CORRECTION

PATENT NO. : 5,912,522
DATED : June 15, 1999
INVENTOR(S) : Nicholas N. Rivera

It is certified that error appears in the above-identified patent and that said Letters Patent is hereby corrected as shown below:

Col. 1, line 19, change "back-ends" to -- back-emfs --.

Col. 1, line 30, delete: "back-emf" --.

Col. 1, line 31, before "voltage" insert: -- back-emf --.

Col. 1, line 37, delete "B is air gap" --.

Col. 1, line 38, before "field" insert: -- B is air gap --.

Col. 5, line 18, delete "between" first occurrence.

Col. 5, lines 18 and 19 delete: "to result in events at the edges between magnets 15" and insert -- and the shorter flux paths at the edges between magnets 15 --.

Col. 6, line 2, change "back-ends" to: -- back emfs --.

Col. 6, line 10, change "Clogging" to -- Cogging --.

Col. 6, line 53, change "triad" to: -- triac --.

Col. 7, line 28, after "one" insert: -- slot --.

Col. 7, line 29, after "all" insert: -- slot --.

Col. 7, line 30, after "fewer" insert: -- slot --.

Col. 7, line 31, after "each" insert: -- slot --.

Col. 9, line 33, change "back-ends" to: -- back-emfs --.

Col. 9, line 42, change "back-ends" to: -- back emfs --.

Col. 10, line 27, change "stage" to: -- mode --.

UNITED STATES PATENT AND TRADEMARK OFFICE
CERTIFICATE OF CORRECTION

PATENT NO. : 5,912,522
DATED : June 15, 1999
INVENTOR(S) : Nicholas N. Rivera

It is certified that error appears in the above-identified patent and that said Letters Patent is hereby corrected as shown below:

Claim 1, line 2, insert a comma after "slot" and delete "path," --.
Claim 4, line 4, change "one" to: -- each --.
Claim 21, line 1, after "providing" insert: -- at least -- .
Claim 34, line 2, after "axis" insert -- of --.

Signed and Sealed this

Fourth Day of January, 2000

Attest:

Attesting Officer

*Acting Commissioner of Patents and Trademarks*

UNITED STATES PATENT AND TRADEMARK OFFICE
CERTIFICATE OF CORRECTION

PATENT NO. : 5,912,522
DATED : June 15, 1999
INVENTOR(S) : Nicholas N. Rivera

It is certified that error appears in the above-identified patent and that said Letters Patent is hereby corrected as shown below:

```
     Col. 1, line 6, cancel: "is a continuation-
in-part" substituting: -- claims the benefit --.

Col. 1, line 7, change: "files" to: -- filed --.
```

Signed and Sealed this

Seventh Day of November, 2000

Attest:

Q. TODD DICKINSON

*Attesting Officer*    *Director of Patents and Trademarks*

UNITED STATES PATENT AND TRADEMARK OFFICE
CERTIFICATE OF CORRECTION

PATENT NO. : 5,912,522  
DATED : June 15, 1999  
INVENTOR(S) : Nicholas N. Rivera Page 1 of 2

It is certified that error appears in the above-identified patent and that said Letters Patent is hereby corrected as shown below:

Col. 1, line 19, change "back-ends" to -- back-emfs --.

Col. 1, line 30, delete: "back-emf" --.

Col. 1, line 31, before "voltage" insert: -- back-emf --.

Col. 1, line 37, delete "B is air gap" --.

Col. 1, line 38, before "field" insert: -- B is air gap --.

Col. 5, line 18, delete "between" first occurrence.

Col. 5, lines 18 and 19 delete: "to result in events at the edges between magnets 15" and insert --and the shorter flux paths at the edges between magnets 15 --.

Col. 6, line 2, change "back-ends" to: -- back emfs --.

Col. 6, line 10, change "Clogging" to -- Cogging --.

Col. 6, line 53, change "triad" to: -- triac --.

Col. 7, line 28, after "one" insert: -- slot --.

Col. 7, line 29, after "all" insert: -- slot --.

Col. 7, line 30, after "fewer" insert: -- slot --.

Col. 7, line 31, after "each" insert: -- slot --.

Col. 9, line 33, change "back-ends" to: -- back-emfs --.

Col. 9, line 42, change "back-ends" to: -- back emfs --.

Col. 10, line 27, change "stage" to: -- mode --.

UNITED STATES PATENT AND TRADEMARK OFFICE
CERTIFICATE OF CORRECTION

PATENT NO. : 5,912,522

DATED : June 15, 1999

INVENTOR(S) : Nicholas N. Rivera

It is certified that error appears in the above-identified patent and that said Letters Patent is hereby corrected as shown below:

Claim 1, line 13, insert a comma after "slot" and delete "path,"--.

Claim 4, line 4, change "one" to --each--.

Claim 21, line 1, after "providing" insert --at least--.

Claim 34, line 2, after "axis" insert --of--.

This certificate supercedes certificate of correction issued January 4, 2000.

Signed and Sealed this

Thirteenth Day of February, 2001

*Attest:*

NICHOLAS P. GODICI

*Attesting Officer*  Acting Director of the United States Patent and Trademark Office